United States Patent [19]

Sydansk

[11] Patent Number: 5,067,564
[45] Date of Patent: Nov. 26, 1991

[54] SELECTIVE PLACEMENT OF A PERMEABILITY-REDUCING MATERIAL TO INHIBIT FLUID COMMUNICATION BETWEEN A NEAR WELL BORE INTERVAL AND AN UNDERLYING AQUIFER

[75] Inventor: Robert D. Sydansk, Littleton, Colo.

[73] Assignee: Marathon Oil Company, Findlay, Ohio

[21] Appl. No.: 596,796

[22] Filed: Oct. 12, 1990

[51] Int. Cl.$^5$ .................. E21B 33/138; E21B 43/22
[52] U.S. Cl. .................. 166/270; 166/273; 166/285; 166/294; 166/295; 166/300
[58] Field of Search .......... 166/269, 270, 273, 285, 166/292, 294, 295, 300, 306, 263

[56] References Cited

U.S. PATENT DOCUMENTS

| 2,402,588 | 6/1946 | Andresen | 166/270 |
|---|---|---|---|
| 3,004,598 | 10/1961 | Ramos et al. | 166/292 |
| 3,148,730 | 9/1964 | Holbert | 166/269 X |
| 3,299,953 | 1/1967 | Bernard | 166/285 |
| 3,369,605 | 2/1968 | Donaldson et al. | 166/306 |
| 4,413,680 | 11/1983 | Sandiford et al. | 166/270 |
| 4,418,755 | 12/1983 | Sifferman | 166/281 |
| 4,428,429 | 1/1984 | Felber et al. | 166/294 |
| 4,569,393 | 2/1986 | Bruning et al. | 166/270 |
| 4,657,944 | 4/1987 | Bruning et al. | 523/130 |
| 4,665,982 | 5/1987 | Brown | 166/250 |
| 4,683,949 | 8/1987 | Sydansk et al. | 166/270 |
| 4,694,906 | 9/1987 | Hutchins et al. | 166/270 X |
| 4,722,397 | 2/1988 | Sydansk et al. | 166/295 |
| 4,776,398 | 10/1988 | Chu et al. | 166/274 |
| 4,928,763 | 5/1990 | Falk | 166/285 X |

OTHER PUBLICATIONS

Blankenship, Michel L., "Polymer Process Cuts Water Coning", American Oil and Gas Reporter, pp. 17-19, Jul. 1989.

Primary Examiner—George A. Suchfield
Attorney, Agent, or Firm—Jack L. Hummel; Jack E. Ebel

[57] ABSTRACT

Undesirable fluid flow is inhibited between a near well bore interval and an underlying aquifer in fluid communication therewith. A permeability-reducing material is injected into the near well bore interval and a portion of the material is selectively overdisplaced out into the formation by means of a low density gas subsequently injected into the interval. The gas desirably restores hydrocarbon productivity or fluid injectivity to the interval while the permeability-reducing material remaining in the interval inhibits fluid communication between the interval and the aquifer.

18 Claims, No Drawings

SELECTIVE PLACEMENT OF A PERMEABILITY-REDUCING MATERIAL TO INHIBIT FLUID COMMUNICATION BETWEEN A NEAR WELL BORE INTERVAL AND AN UNDERLYING AQUIFER

BACKGROUND OF THE INVENTION

1. Technical Field

The invention relates to a process for recovering hydrocarbons from a subterranean hydrocarbon-bearing formation and more particularly to a hydrocarbon recovery process utilizing a permeability-reducing material.

2. Background Information

Fluid communication in the near well bore between a hydrocarbon production interval or a drive fluid injection interval and an underlying aquifer can diminish hydrocarbon recovery from the associated hydrocarbon-bearing formation. Fluid communication can occur either across permeable matrix separating the interval from the aquifer or via one or more vertical fractures or a fracture network connecting the interval and the aquifer.

When hydrocarbons are produced from a formation across a near well bore production interval into the well bore penetrating the formation, water from an underlying aquifer tends to migrate upward into the production interval if there is fluid communication between the interval and the aquifer. Migration of water into the production interval is termed water coning. There are two negative consequences of water coning. The first is that water residing in the production interval can block or significantly diminish the flow of hydrocarbons from the outlying formation into the well bore. The second consequence is that water production can compete with and diminish hydrocarbon production. As a result, the ratio of water to hydrocarbons produced from the well bore can become unacceptably high when water coning occurs.

Water coning is extremely difficult to remedy whether fluid communication between the interval and aquifer is across vertical fractures or matrix. A traditional method of treating water coning is to cement the well bore over the lower portion of the production interval. Unfortunately, well bore cementing at best only slightly reduces water coning and subsequent water production. Water coning usually recurs at the uncemented upper portion of the production interval shortly after the cement treatment, negating the effectiveness of the treatment.

Another means of treating water coning is to inject gels into the fractures or matrix providing fluid communication with the production interval. A gel treatment can block migration of aquifer water into the production interval, but the treatment also unacceptably damages the production interval because of the presence of gel in the interval. Even attempts at selective gel placement, such as mechanical zone isolation, are not entirely satisfactory because the gel tends to migrate into the production interval. Since it is difficult to place a gel using present technology to effectively prevent water coning without excessive damage to the production interval, known gel treatments have limited practical utility for the prevention of water coning.

The inverse problem to water coning exists where there is fluid communication between an underlying aquifer and a drive fluid injection interval. Hydrocarbon drive fluids are commonly injected into a hydrocarbon-bearing formation via the injection interval of an injection well bore to displace the hydrocarbons into an adjoining production well bore. Where fluid communication exists between the injection interval and the underlying aquifer, particularly in the near well bore, the drive fluid is undesirably diverted away from the outlying hydrocarbon-bearing zones of the formation into the underlying aquifer.

For the same types of reasons that gels are not suited for the treatment of water coning in a production interval, gels are unsuitable for treating the loss of drive fluid from an injection interval. When gels are used to plug fluid pathways between an injection interval and an aquifer, corresponding plugging of the injection interval is virtually unavoidable, even with zone isolation. As such, gel treatments unacceptably reduce injectivity into the injection well bore and reduce hydrocarbon production from the adjacent production well bore.

A treatment process is needed for selectively placing a permeability-reducing material in the lower portion of a near well bore production or injection interval in fluid communication with an underlying aquifer via permeable matrix or vertical fractures. A treatment process is further needed which does not significantly diminish fluid communication between the upper portion of the near well bore interval and an outlying hydrocarbon-bearing formation when the permeability-reducing material is placed in the lower portion of the interval.

SUMMARY OF THE INVENTION

The present invention is a process for inhibiting fluid flow between a near well bore interval and an aquifer underlying the interval. The interval is penetrated by a well bore which is either an injection well bore or a production well bore in fluid communication with a hydrocarbon-bearing reservoir.

In the case of a production well bore, the present process inhibits water coning and its attendant consequences including the reduction of the relative permeability of oil in the near well bore production interval and the production of aquifer water into the well bore. In the case of an injection well bore, the present process inhibits the flow of drive fluid from the near well bore injection interval into the underlying aquifer.

The process comprises injection of a flowing permeability-reducing material across the entire vertical interval of the near well bore. Injection of the permeability-reducing material is followed by the controlled injection of a less dense gas into the upper portion of the interval. The gas overdisplaces the permeability-reducing material from the upper portion of the interval out into the formation where it dissipates without substantially altering the injection or production capacity of the well. The permeability-reducing material injected into the lower portion of the interval, which encompasses permeable matrix or fractures in fluid communication with the underlying aquifer, remains therein and transforms from a flowing state to a nonflowing state to effect permeability reduction.

The present process enables selective placement of the permeability-reducing material in the lower portion of the production interval a sufficient distance from the well bore to effectively inhibit undesirable water coning or drive fluid dissipation, without excessively damaging the upper portion of the interval. The overdisplacing gas obviates the need for selective injection of the permeability-reducing material into the interval because the gas enables restoration of desirable fluid communication between the hydrocarbon reservoir and the well bore across the upper portion of the interval even after injection of the permeability-reducing material into the upper portion. Thus, the process is advantageously performed without the use of mechanical zone isolation and costly workovers which require a rig.

DESCRIPTION OF PREFERRED EMBODIMENTS

In a first embodiment, the present invention is a treatment process for selectively placing a permeability-reducing material in the lower portion of a near well bore hydrocarbon production interval by means of an overdisplacing gas. In a second embodiment, the invention is a treatment process for selectively placing a permeability-reducing material in the lower portion of a near well bore injection interval by means of an overdisplacing gas.

The process of both embodiments preferably applies to an interval which is in fluid communication with both a hydrocarbon-bearing reservoir and an underlying aquifer, i.e., the interval exhibits good vertical permeability. The interval may be in fluid communication with the aquifer across a matrix or a substantially vertical fracture, either of which is permeable to aquifer water or injected drive fluids.

As used herein, the term "vertical fracture" encompasses a single substantially vertical fracture connecting the interval and the aquifer, a plurality of substantially vertical fractures connecting the interval and the aquifer in parallel, or a network of substantially vertical fractures connecting the interval and the aquifer in series.

The term "near well bore", as defined herein, constitutes a volume of the formation in direct fluid communication with the well bore and extending a finite radial distance from the well bore face. The near well bore preferably extends a radial distance up to about 10 meters from the well bore face and more preferably up to about 30 meters from the well bore face. The near well bore is the desired treatment zone of the present invention.

The permeability-reducing material is selectively placed in the lower portion of the near well bore interval by first conventionally injecting the material in a liquid-like flowing state across the entire vertical near well bore interval. The overdisplacing gas is subsequently injected into the interval at a controlled rate and injection pressure known to one skilled in the art which optimizes preferential entry of the overdisplacing gas into the upper portion of the interval and minimizes entry of the overdisplacing gas into the lower portion of the interval.

The gas overdisplaces the flowing permeability-reducing material from the upper portion of the interval away from the near well bore in a substantially radial direction. The radially displaced material is dissipated out into the formation where the material does not substantially diminish the production or displacement capacity of the well. To some extent, the gas may also overdisplace a part of the permeability-reducing material from the upper portion of the interval in a downward direction into the lower portion of the interval. The net effect of gas overdisplacement is to substantially restore permeability in the upper interval to desirable injected drive fluids or produced hydrocarbons.

The preference of the overdisplacing gas to enter the upper portion of the interval is enhanced by the substantially lower density of the gas relative to the density of the permeability-reducing material. The specific gravity of the gas is between about 0.001 and about 0.2 and preferably between about 0.005 and about 0.1. The specific gravity of the permeability-reducing material is between about 0.94 and about 2.0 and preferably between about 1.0 and about 1.5.

The overdisplacing gas is also preferably inert and immiscible with the permeability-reducing material. A preferred overdisplacing gas for use in conjunction with the preferred permeability-reducing material is nitrogen or natural gas, although virtually any other gas meeting the density and miscibility requirements recited herein has utility in the present invention.

After the overdisplacing gas is injected, the well bore penetrating the interval is preferably shut in to enable the heretofore flowing permeability-reducing material in the lower portion of the interval to transform to a nonflowing state. As used herein, the permeability-reducing material is deemed "flowing" if it is displaceable from the upper portion of the near well bore interval by an overdisplacing gas. The material is deemed "nonflowing" if it has sufficient structure to resist propagation from the lower portion of the interval during well bore operations for injection or production purposes.

After the material sets up to a nonflowing state, the well bore is restored to normal operation as an injection or production well bore. In the case of a production well bore, water coning is preferably diminished and hydrocarbon production is maintained or increased over that prior to treatment while water production is decreased. In the case of an injection well bore, the amount of injected drive fluid lost to the aquifer is preferably reduced without significantly impairing the injectivity of the interval.

A preferred permeability-reducing material satisfying the above-recited criteria is a crosslinked polymer gel. The term "gel" as used herein is directed to a continuous three-dimensional crosslinked polymeric network integrating a liquid into the interstics of the network. The crosslinked polymer gel comprises a crosslinkable polymer, a crosslinking agent, and a liquid solvent.

The crosslinkable polymer is preferably a carboxylate-containing polymer and more preferably an acrylamide-containing polymer. Of the acrylamide-containing polymers, the most preferred are polyacrylamide (PA), partially hydrolyzed polyacrylamide (PHPA), copolymers of acrylamide and acrylate, and carboxylate-containing terpolymers of acrylate. PA, having utility herein has from about 0.1% to about 3% of its amide groups hydrolyzed. PHPA, as defined herein, has greater than about 3% of its amide groups hydrolyzed.

The crosslinking agent in the gel effects chemical crosslinking between the carboxylate sites of the same or different polymer molecules. Crosslinking of the polymer creates the network structure of the gel. The crosslinking agent is preferably a molecule or complex containing a reactive transition metal cation. A most preferred crosslinking agent comprises a trivalent chromium cation complexed or bonded to an anion, atomic oxygen or water. Exemplary crosslinking agents are chromic triacetate ($CrAc_3$) and chromic trichloride. Other transition metal cations which are found in crosslinking agents having utility in the present invention, although less preferred, are chromium VI within a redox system, aluminum III, iron II, iron III and zirconium IV.

The liquid solvent may be any liquid in which the polymer and crosslinking agent can be dissolved, mixed, suspended or otherwise dispersed to facilitate gel formation. The solvent is preferably an aqueous liquid such as distilled water, fresh water or a brine.

A number of the most preferred gels which have utility within the present invention are taught in U.S. Pat. No. 4,683,949 which is incorporated herein by reference.

The gel is formed by admixing the polymer and crosslinking agent at the surface. Surface admixing broadly encompasses inter alia mixing of the gel components in bulk at the surface prior to injection or simultaneously mixing the gel components at or near the wellhead by in-line mixing means while injecting them. The volume of gel required is a function of the characteristics of the interval, the adjoining formation and the fluids contained therein and is readily determinable by one skilled in the art.

Crosslinking, or gelation as it is alternatively termed, is initiated as soon as the polymer and crosslinking agent contact and proceeds until either the crosslinking agent or the crosslinking sites of the polymer are consumed. The gel is injected into the interval in a flowing state before crosslinking is completed, i.e., while the gel is immature. The gel is crosslinked to completion, i.e., reaches maturity, in situ after injection of the overdisplacing gas. Complete crosslinking transforms the gel to a nonflowing state.

The following example demonstrates the practice and utility of the present invention, but is not to be construed as limiting the scope thereof.

EXAMPLE

An oil reservoir is located in a clean high-permeability sandstone formation which is highly faulted. The oil reservoir is at a depth of 1700 meters. The reservoir pressure is 21,000 kPa. The reservoir temperature is 88° C. In situ oil viscosity is 0.5 cp. The reservoir pay interval is about 26 meters thick and directly overlays an active aquifer which extends up into the producing formation. Horizontal and vertical permeabilities of the formation are nearly equal. The average effective permeability at residual oil saturation under reservoir conditions is 285 md.

A well penetrating the formation is perforated over the upper 21 meters of the reservoir pay interval. The well initially produces at 14,800 $m^3$ of oil per day and at 0 $m^3$ of water per day. However, after several weeks of production, water production from the well begins and water cuts from the well increase rapidly thereafter. The specific gravity of the produced water is 1.03. After two months of production the well produces only 330 $m^3$ of oil per day and 10,800 $m^3$ of water per day as the result of water coning through the matrix reservoir rock.

In response to water coning, 1260 $m^3$ of an immature flowing crosslinked polyacrylamide gel are injected into the perforated interval of the well. The gel comprises polyacrylamide at a concentration of 4.5 weight percent in fresh water which has a molecular weight of 500,000 and which is hydrolyzed at 0.5 mole percent. The polyacrylamide is crosslinked with chromic acetate at a PA:CrAc$_3$ weight ratio of 9:1. The gel treatment is designed for total matrix shut off up to a radial distance of 4.3 meters from the well bore face.

The immature gel in the upper half of the producing interval is overdisplaced by injecting a natural gas volume of 56,600 standard cubic meters into the interval over a 31 hour period at a downhole injection differential pressure of 140 kPa subject to fluctuations. Upon completion of the gas injection, the well is shut in for 48 hours to enable maturity of the gel. Thereafter, oil production from the well is resumed.

Post treatment production from the well initially stabilizes at 1820 $m^3$ of oil per day and 3210 $m^3$ of water per day. After two months of post-treatment production, the well produces at 1640 $m^3$ of oil per day and 3740 $m^3$ of water per day. A post-treatment production log indicates that fluid production is almost exclusively from the upper half of the perforated interval, whereas a pre-treatment production log indicates that a majority of the fluids are produced from the lower half of the producing interval.

I claim:

1. A process for selectively placing a permeability-reducing material in a near well bore interval which has an underlying aquifer in fluid communication with said interval comprising:
   injecting a flowing permeability-reducing material into an upper portion and a lower portion of said near well bore interval;
   injecting a gas having a density substantially less than the density of said flowing permeability-reducing material into said upper portion of said interval to displace said flowing permeability-reducing material from said upper portion of said interval; and
   transforming said flowing permeability-reducing material in said lower portion of said interval to a nonflowing permeability-reducing material which substantially reduces fluid communication between said upper portion of said interval and said underlying aquifer.

2. The process of claim 1 wherein said flowing permeability-reducing material is an immature crosslinked polymer gel.

3. The process of claim 2 wherein said gel comprises an acrylamide-containing polymer and a metal cation-containing crosslinking agent.

4. The process of claim 3 wherein said acrylamide-containing polymer is selected from the group consisting of polyacrylamide, partially hydrolyzed polyacrylamide, copolymers and acrylamide and acrylate, and carboxylate-containing terpolymers of acrylate.

5. The process of claim 3 wherein said metal cation is selected from the group consisting of chromium, aluminum, iron and zirconium.

6. The process of claim 3 wherein said metal cation is trivalent chromium.

7. The process of claim 1 wherein said interval is a hydrocarbon-production interval in fluid communication with a hydrocarbon reservoir.

8. The process of claim 1 wherein said interval is an injection interval in fluid communication with a hydrocarbon reservoir.

9. The process of claim 1 wherein fluid communication between said interval and said aquifer is across permeable matrix.

10. The process of claim 1 wherein fluid communication between said interval and said aquifer is across a substantially vertical fracture.

11. The process of claim 1 wherein said gas is substantially immiscible with said permeability-reducing material.

12. The process of claim 1 wherein said gas is selected from the group consisting of nitrogen and natural gas.

13. A process for selectively placing a permeability-reducing gel in a near well bore hydrocarbon production interval to substantially reduce water coning resulting from fluid communication between said interval and an underlying aquifer comprising:

injecting an immature flowing crosslinked polymer gel into an upper portion and lower portion of said near well bore hydrocarbon production interval, wherein said immature flowing gel comprises an acrylamide-containing polymer and a metal cation-containing crosslinking agent;

injecting an overdisplacing gas having a density substantially less than said immature flowing gel and substantially immiscible with said immature flowing gel into said upper portion of said near well bore hydrocarbon production interval to displace said immature flowing gel from said upper portion of said interval;

shutting in said well bore for a time sufficient to enable said immature gel in said lower portion of said interval to mature into a nonflowing gel; and producing hydrocarbons across said upper portion of said interval while substantially reducing water coning therein.

14. The process of claim 13 wherein said immature gel penetrates formation matrix in said lower portion of said interval to reduce the permeability of said matrix to water in said aquifer.

15. The process of claim 13 wherein said immature gel penetrates a vertical fracture in said lower portion of said interval to reduce the permeability of said vertical fracture to water in said aquifer.

16. A process for selectively placing a permeability-reducing gel in a near well bore injection interval in fluid communication with an underlying aquifer and a hydrocarbon-bearing reservoir to substantially divert an injected drive fluid from said aquifer to said hydrocarbon-bearing reservoir comprising:

injecting an immature flowing crosslinked polymer gel into an upper portion and a lower portion of said near well bore injection interval, wherein said immature flowing gel comprises an acrylamide-containing polymer and a metal cation-containing crosslinking agent;

injecting an overdisplacing gas having a density substantially less than said immature flowing gel and substantially immiscible with said immature flowing gel into said upper portion of said near well bore injection interval to displace said immature flowing gel from said upper portion of said interval;

shutting in said well bore for a time sufficient to enable said immature gel in said lower portion of said interval to mature into a nonflowing gel; and injecting a drive fluid across said upper portion of said interval into said hydrocarbon-bearing reservoir.

17. The process of claim 16 wherein said immature gel penetrates formation matrix in said lower portion of said interval to reduce the permeability of said matrix to said drive fluid.

18. The process of claim 16 wherein said immature gel penetrates a vertical fracture in said lower portion of said interval to reduce the permeability of said vertical fracture to said drive fluid.

* * * * *